(12) United States Patent
Neilson et al.

(10) Patent No.: US 9,188,831 B2
(45) Date of Patent: Nov. 17, 2015

(54) COMPACT WAVELENGTH-SELECTIVE CROSS-CONNECT DEVICE HAVING MULTIPLE INPUT PORTS AND MULTIPLE OUTPUT PORTS

(75) Inventors: David T. Neilson, Old Bridge, NJ (US); Roland Ryf, Aberdeen, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 572 days.

(21) Appl. No.: 13/399,270

(22) Filed: Feb. 17, 2012

(65) Prior Publication Data
US 2013/0216183 A1   Aug. 22, 2013

(51) Int. Cl.
| | |
|---|---|
| *G02B 6/35* | (2006.01) |
| *G02F 1/31* | (2006.01) |
| *G02B 6/293* | (2006.01) |
| *H04Q 11/00* | (2006.01) |
| *H04J 14/02* | (2006.01) |

(52) U.S. Cl.
CPC ............... *G02F 1/31* (2013.01); *G02B 6/2931* (2013.01); *G02B 6/29311* (2013.01); *G02B 6/356* (2013.01); *H04Q 11/0005* (2013.01); *G02B 6/3512* (2013.01); *G02B 6/3556* (2013.01); *H04J 14/0212* (2013.01); *H04Q 2011/0016* (2013.01)

(58) Field of Classification Search
None
See application file for complete search history.

(56) References Cited

U.S. PATENT DOCUMENTS

| | | | |
|---|---|---|---|
| 6,636,654 B2 * | 10/2003 | McGuire, Jr. ............. | 385/17 |
| 6,707,959 B2 * | 3/2004 | Ducellier et al. .......... | 385/17 |
| 6,711,316 B2 | 3/2004 | Ducellier | |
| 6,751,415 B1 * | 6/2004 | Fabiny ....................... | 398/50 |
| 6,819,823 B2 * | 11/2004 | Solgaard et al. .......... | 385/18 |
| 6,836,381 B2 | 12/2004 | Giles et al. | |
| 6,876,475 B1 * | 4/2005 | Trisnadi et al. ........... | 359/237 |
| 6,947,628 B1 | 9/2005 | Peng et al. | |
| 6,996,343 B2 | 2/2006 | Neilson | |
| 7,106,966 B1 * | 9/2006 | Lalonde et al. ........... | 398/46 |

(Continued)

FOREIGN PATENT DOCUMENTS

| | | |
|---|---|---|
| CN | 1397812 A | 2/2003 |
| JP | 2006178454 A | 7/2006 |

(Continued)

OTHER PUBLICATIONS

Zong, Lei, et al., "Study on Wavelength Cross-Connect Realized with Wavelength Selective Switches," Optical Fiber Communication Conference and Exposition and the National Fiber Optic Engineers Conference, Optical Society of America, 2006, paper NThC3, pp. 1-7.

(Continued)

*Primary Examiner* — Mike Stahl
(74) *Attorney, Agent, or Firm* — Mendelsohn, Drucker & Dunleavy, P.C.; Yuri Gruzdkov (57) ABSTRACT

A wavelength-selective cross-connect (WSXC) device having N input ports and M output ports and configured to route any set of one or more carrier wavelengths from a corresponding input port to any selected output port. In one embodiment, the WSXC device includes a diffraction grating and a beam-steering device optically coupled to each other and to the input/output ports so that each of the carrier wavelengths traverses the diffraction grating and the beam-steering device two or more times en route from the respective input port to a designated output port. Various unfolded configurations of the WSXC device are also disclosed.

18 Claims, 7 Drawing Sheets

(56) References Cited

U.S. PATENT DOCUMENTS

| | | | |
|---|---|---|---|
| 7,203,400 B2 | 4/2007 | Neilson | |
| 7,254,292 B2 | 8/2007 | Tian et al. | |
| 7,283,709 B2 | 10/2007 | Doerr et al. | |
| 7,336,867 B2 | 2/2008 | Wu et al. | |
| 7,397,980 B2 | 7/2008 | Frisken | |
| 7,558,447 B2 | 7/2009 | Suh et al. | |
| 7,689,073 B2 | 3/2010 | Kozhevnikov et al. | |
| 7,702,194 B2 | 4/2010 | Presley et al. | |
| 8,611,742 B2 | 12/2013 | Yang et al. | |
| 2002/0030814 A1* | 3/2002 | Mikes et al. | 356/328 |
| 2002/0071627 A1* | 6/2002 | Smith et al. | 385/15 |
| 2002/0076146 A1* | 6/2002 | Iyer et al. | 385/24 |
| 2002/0131687 A1* | 9/2002 | Wilde | 385/24 |
| 2003/0021522 A1 | 1/2003 | Ducellier | |
| 2003/0053749 A1* | 3/2003 | Weverka et al. | 385/24 |
| 2004/0076368 A1 | 4/2004 | Takushima et al. | |
| 2004/0184153 A1 | 9/2004 | Neilson | |
| 2004/0207893 A1* | 10/2004 | Miller et al. | 359/212 |
| 2005/0002600 A1* | 1/2005 | Ducellier et al. | 385/17 |
| 2005/0018259 A1* | 1/2005 | Holmes | 359/3 |
| 2005/0105909 A1* | 5/2005 | Stone | 398/87 |
| 2005/0213877 A1* | 9/2005 | Wu et al. | 385/18 |
| 2006/0067611 A1* | 3/2006 | Frisken et al. | 385/16 |
| 2006/0222290 A1* | 10/2006 | Yamashita et al. | 385/18 |
| 2006/0228070 A1 | 10/2006 | Davis et al. | |
| 2008/0031627 A1 | 2/2008 | Smith et al. | |
| 2008/0218872 A1 | 9/2008 | Yuan et al. | |
| 2008/0316585 A1* | 12/2008 | Cohen et al. | 359/303 |
| 2009/0028502 A1* | 1/2009 | Presley et al. | 385/18 |
| 2009/0220233 A1 | 9/2009 | Presley et al. | |
| 2010/0172646 A1 | 7/2010 | Colbourne | |
| 2011/0280573 A1* | 11/2011 | Collings et al. | 398/48 |
| 2012/0057869 A1* | 3/2012 | Colbourne | 398/49 |
| 2012/0093458 A1 | 4/2012 | Matsuura et al. | |
| 2013/0038917 A1 | 2/2013 | Watanabe et al. | |
| 2013/0155501 A1 | 6/2013 | Matsumoto | |
| 2013/0194537 A1 | 8/2013 | Mao et al. | |
| 2013/0272650 A1 | 10/2013 | Ishikawa et al. | |
| 2014/0205291 A1 | 7/2014 | Suzuki et al. | |
| 2015/0208143 A1 | 7/2015 | Frisken | |

FOREIGN PATENT DOCUMENTS

| | | |
|---|---|---|
| JP | 2007519010 A | 7/2007 |
| JP | 2009545771 A | 12/2009 |
| JP | WO2013038713 A1 | 3/2015 |
| KR | 1020090048618 A | 5/2009 |

OTHER PUBLICATIONS

Cavendish, D., et al., "Next Generation Multi-Service Optical Networks," in Network Architectures, Management, and Applications III, Proc. of SPIE, vol. 6022, 2005, pp. 1-10.

U.S. Appl. No. 13/851,371, filed Mar. 27, 2013.

"Ophthalmic Optics Files: 4. Ophthalmic Lenses the Different Types", http://www.essiloracademy.eu/EN/press/Pages/ooof.aspx: Published in the 1980's [retrieved on Mar. 27, 2013]. Retrieved from the Internet: <URL: http://www.essiloracademy.eu/SiteCollection-Documents/WEBSHOP/Cahiers%20d%27Optique%20Oculaire/collectoren/OOF_4_Astigmatic_lenses.pdf > (25 pages).

"A Performance Comparison of WSS Switch Engine Technologies", www.jdsu.com, 2012 [retrieved on Jan. 13, 2012]. Retrieved from the Internet: <URL: www.jdsu.com/ProductLiterature/wsscomp_wp_cms_ae.pdf> pp. 1-24.

Jui-Che, T., et al., "1/spl Times/N<2> Wavelength-Selective Switches with Tilted 2D Collimator Arrays for Inter-Channel-Response Suppression", Conference on Lasers and Electro-Optics, San Francisco, CA, May 20-21, 2004, pp. 1-4.

Sorimoto, K. et al., "Polarization Insensitive Wavelength Selective Switch Using LCOSs and Monolithically Integrated Multi-Layered AWG", Optoeelectronics and communications Conference, 15th IEEE, Piscataway, NJ, Jul. 5, 2010, pp. 82-83.

Yong T. L., et al., "Reconfigurable Optical Interconnect Architecuture Using an Opto-BLSI Processor for Hight-Performance Optical Networks", International Conference on Optical Internet, Jul. 11, 2010, pp. 1-3.

International Search Report and Written Opinion; Mailed May 2, 2013 for the corresponding PCT Application No. PCT/US2013/025824.

Taiwan Office Action; Mailed Jul. 24, 2014 for the related TW Application No. TW102105038.

Japanese Notification of Reasons for Refusal; Mailed Aug. 20, 2015 for the corresponding JP Application No. JP2014-557732 along with a machine translation.

* cited by examiner

COMPACT WAVELENGTH-SELECTIVE CROSS-CONNECT DEVICE HAVING MULTIPLE INPUT PORTS AND MULTIPLE OUTPUT PORTS

BACKGROUND

1. Field of the Invention

The present disclosure relates to optical communication equipment and, more specifically but not exclusively, to wavelength-selective cross-connect switches and reconfigurable optical add/drop multiplexers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Wavelength-selective cross-connect (WSXC) switches and reconfigurable optical add/drop multiplexers (ROADMs) are important network elements in optical wavelength-division-multiplexing (WDM) networks because they can support dynamic provisioning and automated restoration in the network and can be implemented to be transparent to the signal bit rate, modulation format, and transmission protocol. Substantially the same physical-device architecture can be used to implement a WSXC switch and a ROADM, with the classification of the resulting physical device as the former or the latter depending mostly on the degree of switching enabled by the device. An optical-WDM network architecture employing WSXC devices has many attractive features that help to accelerate service deployment, accelerate rerouting around points of failure in the network, reduce capital and operating expenses for the service provider, and provide a network topology that is amenable to future network upgrades.

A conventional WSXC device typically comprises a plurality of individual constituent optical devices, such as de-multiplexers, switches, and multiplexers (MUXs), and numerous fiber connections between them. With the rapid growth of optical transport capacities, the number of constituent optical devices that are required to implement an adequate conventional WSXC device may be on the order of one hundred or more. As a result, conventional WSXC devices are disadvantageously facing many challenges, such as increased footprint, relatively high maintenance complexity and cost, and reduced reliability.

SUMMARY

Disclosed herein are various embodiments of a wavelength-selective cross-connect (WSXC) device having N input ports and M output ports and configured to route any set of one or more carrier wavelengths from a corresponding input port to any selected output port. In one embodiment, the WSXC device includes a diffraction grating and a beam-steering device optically coupled to each other and to the input/output ports so that each of the carrier wavelengths traverses the diffraction grating and the beam-steering device two or more times en route from the respective input port to a designated output port. Various unfolded configurations of the WSXC device are also disclosed. The disclosed embodiments have certain advantages over conventional WSXC devices, e.g., because they can be implemented using a relatively small number of constituent device components, have a relatively small footprint, have good scalability characteristics, and allow for flexible wavelength channel-center and width assignment.

According to one embodiment, provided is an apparatus comprising a first plurality of ports; a second plurality of ports; a first diffraction grating interposed between the first plurality of ports and the second plurality of ports; and a first beam-steering device interposed between the first plurality of ports and the second plurality of ports. Each port of the first plurality is configured to receive a respective input WDM signal having two or more respective WDM components. The apparatus is configured to variously route the WDM components from the first plurality of ports to the second plurality of ports so that each of the WDM components traverses the first diffraction grating and the first beam-steering device. The first diffraction grating is configured to spectrally disperse light received from the first plurality of ports and direct spectrally dispersed light to the first beam-steering device. The first beam-steering device is configurable to individually steer beams corresponding to different wavelength bands of the spectrally dispersed light received from the first diffraction grating to enable the apparatus to route any of the WDM components from the respective port of the first plurality to any port of the second plurality.

In some embodiments of the above apparatus, the first plurality of ports and the second plurality of ports have at least one port in common.

In some embodiments of any of the above apparatus, the apparatus further comprises an optical circulator connected to a first of said common ports and configured to separate an output WDM signal applied to the first common port from the input WDM signal received by the first common port.

In some embodiments of any of the above apparatus, the apparatus has a folded structure that causes a WDM component to traverse the first diffraction grating four times.

In some embodiments of any of the above apparatus, the folded structure causes the WDM component to traverse the first beam-steering device two times.

In some embodiments of any of the above apparatus, the apparatus further comprises a curved mirror configured to direct light between the first diffraction grating and the first beam-steering device so that the WDM component traverses the mirror eight times.

In some embodiments of any of the above apparatus, the ports of the first plurality are arranged in a two-dimensional array.

In some embodiments of any of the above apparatus, the ports of the second plurality are arranged in a two-dimensional array.

In some embodiments of any of the above apparatus, the first beam-steering device comprises a two-dimensional pixelated MEMS mirror array.

In some embodiments of any of the above apparatus, at least one mirror in said array is configured to tilt around two different axes.

In some embodiments of any of the above apparatus, the first beam-steering device comprises a pixelated liquid-crystal-on-silicon micro-display.

In some embodiments of any of the above apparatus, the apparatus further comprises: a second diffraction grating interposed between the first plurality of ports and the second plurality of ports; and a second beam-steering device interposed between the first plurality of ports and the second plurality of ports, wherein the apparatus is further configured to route the WDM components from the first plurality of ports to the second plurality of ports so that each of the WDM components also traverses the second diffraction grating and the second beam-steering device.

In some embodiments of any of the above apparatus, for each port of the second plurality: the second beam-steering device is configured to reduce angular diversity among optical beams that carry the WDM components routed to the port; and the second diffraction grating is configured to remove spectral dispersion of said optical beams.

In some embodiments of any of the above apparatus, the apparatus has a folded structure that causes a WDM component to traverse each of the first diffraction grating and the second diffraction grating two times.

In some embodiments of any of the above apparatus, the apparatus further comprises: a first curved mirror configured to direct light between the first diffraction grating and the first beam-steering device so that the WDM component traverses the first mirror four times; and a second curved mirror configured to direct light between the second diffraction grating and the second beam-steering device so that the WDM component traverses the second mirror four times.

In some embodiments of any of the above apparatus, the second diffraction grating has nominal spectral-dispersion characteristics that are different from nominal spectral-dispersion characteristics of the first diffraction grating.

In some embodiments of any of the above apparatus, the apparatus further comprises: a third diffraction grating interposed between the first plurality of ports and the second plurality of ports; and a fourth diffraction grating interposed between the first plurality of ports and the second plurality of ports, wherein the apparatus is further configured to route the WDM components from the first plurality of ports to the second plurality of ports so that each of the WDM components also traverses the third diffraction grating and the fourth diffraction grating.

In some embodiments of any of the above apparatus, the first and third diffraction gratings have identical nominal spectral-dispersion characteristics; and the second and fourth diffraction gratings have identical nominal spectral-dispersion characteristics.

In some embodiments of any of the above apparatus, the nominal spectral-dispersion characteristics of the first and third diffraction gratings are different from the nominal spectral-dispersion characteristics of the second and fourth diffraction gratings.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
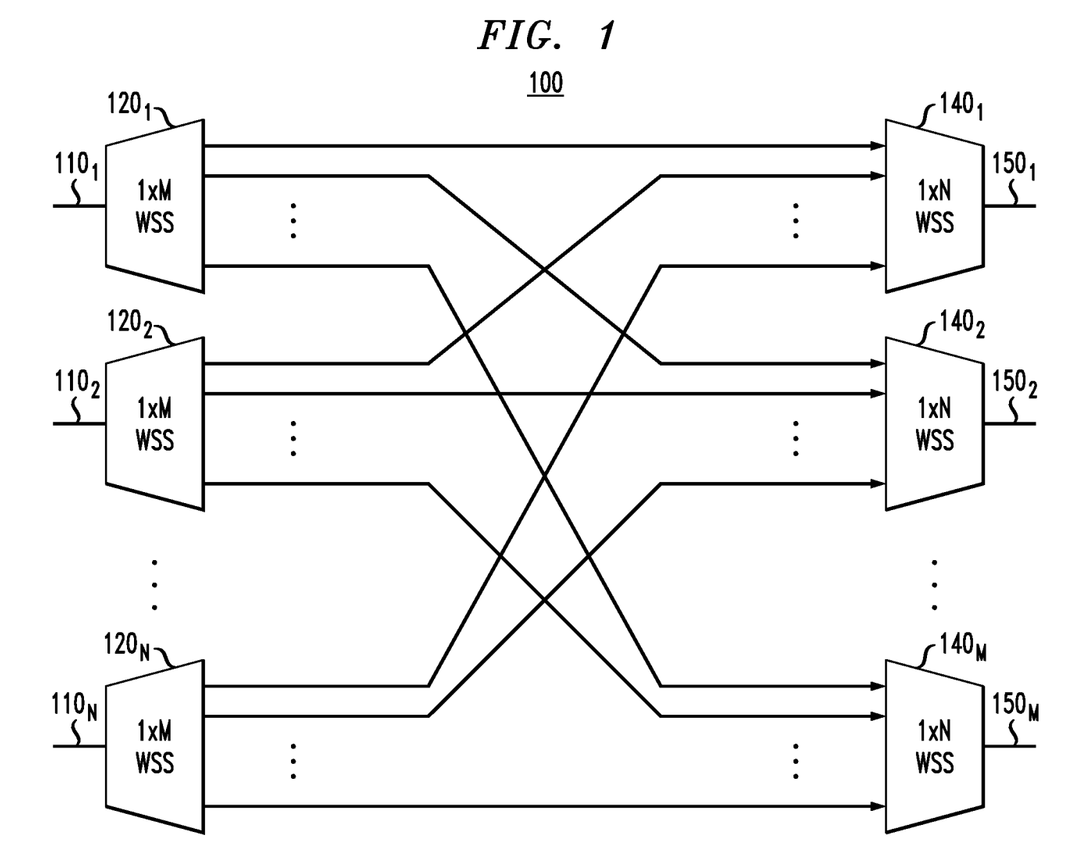
FIG. 1 shows a block diagram that illustrates a representative functionality of a wavelength-selective cross-connect (WSXC) device according to one embodiment of the disclosure.

FIG. 1 shows a block diagram of a device 100 that illustrates representative functionality of a wavelength-selective cross-connect (WSXC) device according to one embodiment of the disclosure. Device 100 has N input ports $110_1$-$110_N$ and M output ports $150_1$-$150_M$, where N and M are (either the same or different) integers greater than one. In a representative configuration, each of input ports 110 and output ports 150 has a respective optical fiber (not explicitly shown in FIG. 1) connected to it. In operation, each of these optical fibers is configured to transport a respective WDM signal. In principle, each of the transported WDM signals can have an arbitrary number of WDM components (modulated carrier wavelengths), with the total number K of unique carrier wavelengths that are being handled by device 100 being independent of N and/or M.

Device 100 is shown as having N (1×M) wavelength-selective switches (WSSs) $120_1$-$120_N$ and M (1×N) wavelength-selective switches (WSSs) $140_1$-$140_M$. A wavelength-selective switch is a (re)configurable optical multiplexer/de-multiplexer that can be configured to route the full set or any selected subset of the K carrier wavelengths between its common port and a selected one of its plural ports. As used herein, the term "common port" refers to the port located at the side of the switch having a single port (see FIG. 1). The term "plural port" refers to any of the ports located at the side of the switch having multiple ports (also see FIG. 1). For example, in device 100, each wavelength-selective switch $120_i$ has its common port connected to the corresponding input port $110_i$. Similarly, each wavelength-selective switch $140_i$ has its common port connected to the corresponding output port $150_i$. The plural ports of wavelength-selective switches $120_1$-$120_N$ are connected to the plural ports of wavelength-selective switches $140_1$-$140_M$ as indicated in FIG. 1. The latter connection can be implemented, e.g., through free space with mirrors and lenses or through optical waveguides.

Each wavelength-selective switch 120 is configured to operate as a configurable de-multiplexer that routes optical signals from the common port to the various plural ports. Each wavelength-selective switch 140 is configured to operate as a configurable multiplexer that routes optical signals from the various plural ports to the common port. Using the routing characteristics of wavelength-selective switches 120 and 140, device 100 is capable of directing any carrier wavelength or any set of two or more carrier wavelengths from any input port 110 to any output port 150. Device 100 usually employs a switch controller (not explicitly shown in FIG. 1) that is operatively connected to control the routing configurations of wavelength-selective switches 120 and 140. The controller uses appropriate routing algorithms, e.g., to avoid signal collisions at any of output ports $150_1$-$150_M$, with a collision being an event in which two different optical signals having the same carrier wavelength arrive simultaneously at the same output port 150.

Various wavelength-selective switches that can be used to implement wavelength-selective switches $120_1$-$120_N$ and $140_1$-$140_M$ in device 100 are disclosed, e.g., in U.S. Pat. Nos. 7,283,709, 7,689,073, and 7,336,867, the teachings of all of which are incorporated herein by reference in their entirety.

Figure 2A:
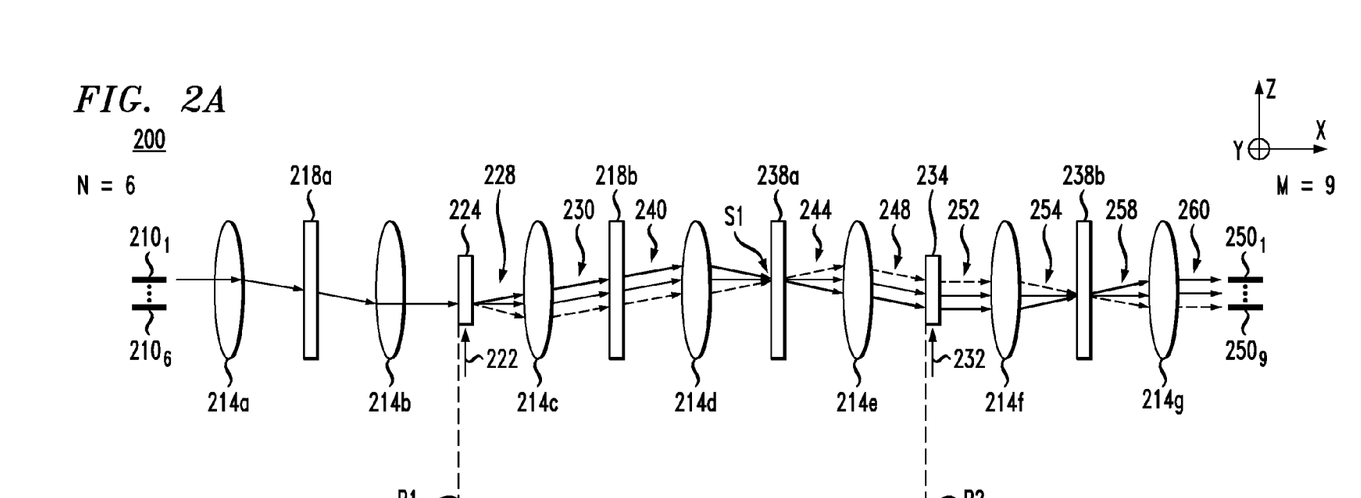
FIGS. 2A-2D illustrate a WSXC device according to one embodiment of the disclosure.
Figure 2B:
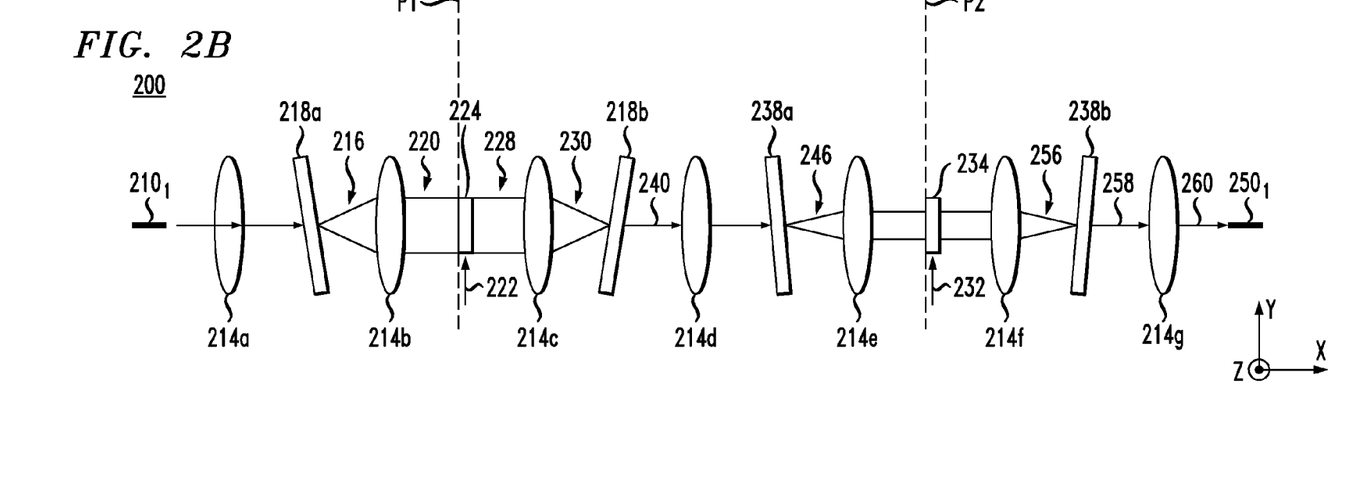
Figure 2C:
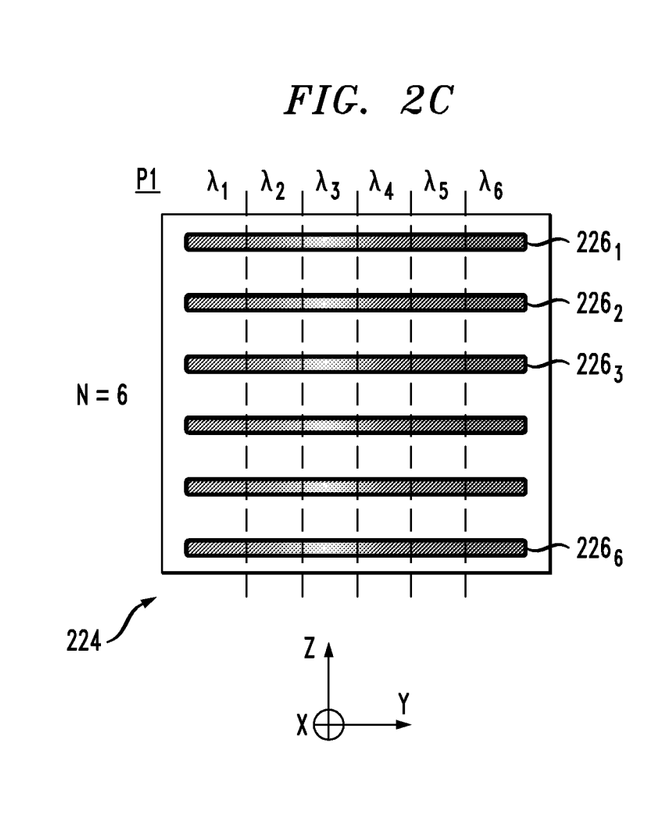
Figure 2D:
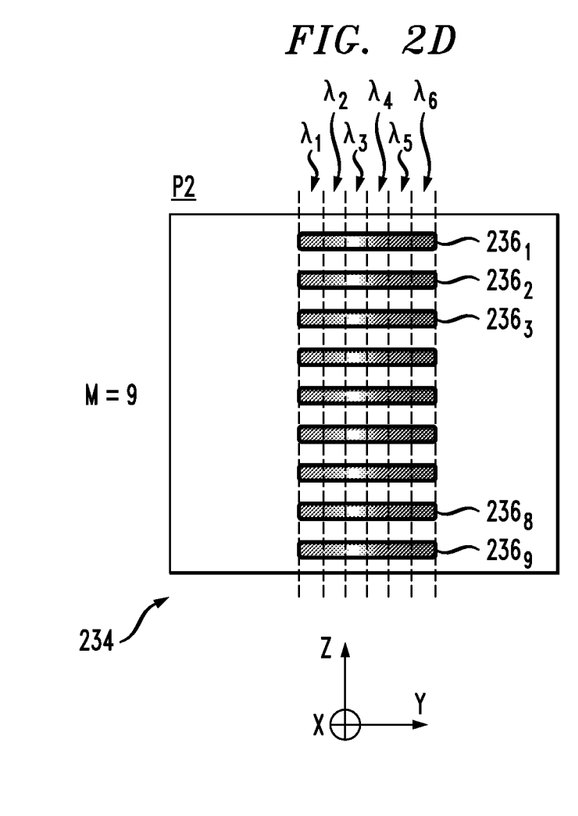

FIGS. 2A-2D illustrate the structure and operation of a WSXC device 200 according to one embodiment of the disclosure. More specifically, FIGS. 2A and 2B show schematic side and top views, respectively, of device 200. FIGS. 2A and 2B also show representative ray traces that are referred to in the description that follows to explain light propagation and processing in device 200. FIGS. 2C and 2D show representative strips of spectrally dispersed light that can be produced in device 200 at planes P1 and P2, respectively, shown in FIGS. 2A-2B.

Device 200 is shown in FIGS. 2A-2B as having six input ports $210_1$-$210_6$ (i.e., N=6) and nine output ports $250_1$-$250_9$ (i.e., M=9). For clarity and brevity of description, the operation of device 200 is explained in reference to six carrier wavelengths λ1-λ6 (i.e., K=6). Based on the provided description, one of ordinary skill in the art will be able to make and use an embodiment of device 200 having any suitable number (N) of input ports, any suitable number (M) of output ports, and any suitable number (K) of WDM channels.

Various embodiments of device 200 have a general functionality analogous to that of WSXC device 100 (FIG. 1). More specifically, input ports 210 of device 200 are functionally analogous to input ports 110 of device 100. Output ports 250 of device 200 are functionally analogous to output ports 150 of device 100. As will be clear from the description that follows, embodiments of device 200 have certain advantages over conventional WSXC devices, e.g., because they can be implemented using a relatively small number of constituent device components, have a relatively small footprint, and have good scalability characteristics.

In one embodiment, each of input ports $210_1$-$210_6$ may be a fiber connector for connecting a corresponding optical fiber configured to deliver a respective optical WDM signal to device 200. Each of output ports $250_1$-$250_9$ may similarly be a fiber connector for connecting a corresponding optical fiber configured to receive a respective optical WDM signal from device 200, e.g., for further transport to external devices.

In an alternative embodiment, each of ports 210 and 250 can be an aperture for receiving a corresponding (e.g., multicolored) collimated beam of light.

In a representative embodiment, input ports $210_1$-$210_6$ are arranged in a linear array oriented along the Z-coordinate axis. Output ports $250_1$-$250_9$ are similarly arranged in a linear array oriented along the Z-coordinate axis. One of ordinary skill in the art will understand that each of the linear arrays can be extended or truncated to produce various embodiments of device 200 corresponding to N≠6 and/or M≠9.

Device 200 comprises diffraction gratings 218a, 218b, 238a, and 238b; beam-steering devices 224 and 234; and lenses 214a-214g. Diffraction gratings 218a and 218b have the same nominal light-dispersion characteristics. Diffraction gratings 238a and 238b similarly have the same nominal spectral-dispersion characteristics. Depending on the particular embodiment, the nominal spectral-dispersion characteristics of diffraction gratings 218 may be the same as or different from the nominal light-dispersion characteristics of diffraction gratings 238. In some embodiments, at least some of lenses 214a-214g may be omitted. Alternative optical elements, such as micro-prism or micro-lens arrays configured to redirect the various beams and/or sub-beams in a similar manner, may be substituted for lenses 214a-214g.

Each of beam-steering devices 224 and 234 may be implemented using (i) a two-dimensional pixelated MEMS mirror array or (ii) a liquid crystal on silicon (LCOS) micro-display. In a MEMS implementation, the orientation of the MEMS mirrors in the array can be controllably changed to steer the corresponding reflected beam(s) of light in the intended direction(s). In an LCOS implementation, the phase shift imparted onto the corresponding optical beam by the individual pixels of the micro-display can be appropriately controlled to create linear optical phase retardation in the direction of the intended beam deflection. In both implementations, different portions of the beam-steering device can be individually configured to steer the different optical beams impinging on the device in different respective directions.

In operation, diffraction grating 218a spectrally disperses the (multicolored) light that it receives through lens 214a from each of input ports $210_1$-$210_6$. The light is spectrally dispersed in the XY plane along the Y-coordinate axis, e.g., as indicated by a diverging sector of traces 216 in FIG. 2B. Lens 214b, which is positioned to have diffraction grating 218a in its focal plane, collimates the diverging light of traces 216 and applies the resulting collimated light beam(s) 220 to beam-steering device 224, e.g., as indicated in FIG. 2B. If input port $210_i$ receives white light, then, at plane P1, which represents a beam-steering surface of beam-steering device 224, diffraction grating 218a generates a corresponding strip $226_i$ of light in which different wavelengths are projected at different locations along the strip in a rainbow-like manner. FIG. 2C shows six such strips, labeled $226_1$-$226_6$. Strips $226_1$-$226_6$ are produced at plane P1 when each of the six input ports $210_1$-$210_6$ of device 200 receives white light. The Z coordinate of each strip 226 corresponds to the Z coordinate of the originating input port 210.

When input port $210_i$ receives a WDM signal having a plurality of modulated carrier wavelengths, the light corresponding to different modulated carrier wavelengths of that WDM signal is confined to different respective areas (patches, wavelength bands) of strip $226_i$. The vertical dashed lines in FIG. 2C indicate the areas corresponding to modulated carrier wavelengths λ1-λ6 in strips $226_1$-$226_6$. As known in the art, light corresponding to a modulated carrier wavelength has a spectral composition that may include the carrier wavelength itself and one or more modulation sidebands. For example, the λ1 area of strip $226_1$ receives carrier wavelength λ1 and its modulation sidebands from input port $210_1$. The λ2 area of strip $226_1$ receives carrier wavelength λ2 and its modulation sidebands from input port $210_1$. The λ3 area of strip $226_1$ receives carrier wavelength λ3 and its modulation sidebands from input port $210_1$, and so on. The λ1 area of strip $226_2$ receives carrier wavelength λ1 and its modulation sidebands from input port $210_2$. The λ2 area of strip $226_2$ receives carrier wavelength λ2 and its modulation sidebands from input port $210_2$. The λ3 area of strip $226_2$ receives carrier wavelength λ3 and its modulation sidebands from input port $210_2$, and so on. The λ1 area of strip $226_6$ receives carrier wavelength λ1 and its modulation sidebands from input port $210_6$. The λ2 area of strip $226_6$ receives carrier wavelength λ2 and its modulation sidebands from input port $210_6$. The λ3 area of strip $226_6$ receives carrier wavelength λ3 and its modulation sidebands from input port $210_6$, and so on.

Device 200 is operatively connected to or comprises a routing controller (not explicitly shown in FIG. 2) configured to appropriately control beam-steering devices 224 and 234. More specifically, the routing controller controls the configuration of beam-steering device 224 via a control signal 222. The routing controller similarly controls the configuration of beam-steering device 234 via a control signal 232. In general, control signals 222 and 232 can cause different pixelated portions of each of beam-steering devices 224 and 234 to adopt different respective beam-steering configurations, e.g., to enable the intended wavelength-selective routing of light from various input ports $210_1$-$210_6$ to various output ports $250_1$-$250_9$.

In a representative embodiment, beam-steering device 224 is configured to steer beams of light by changing their propagation direction in the XZ plane, e.g., as indicated by a fan of traces/beams 228 in FIG. 2A. To implement the requisite wavelength-selective mapping of the linear array of six input ports $210_1$-$210_6$ onto the linear array of nine output ports $250_1$-$250_9$, each pixelated portion of beam-steering device 224 can be configured, based on control signal 222, to produce nine different (e.g., discrete) beam deflection angles. The latter property enables device 200 to appropriately distribute light from the different patches of strips $226_1$-$226_6$ shown in FIG. 2C into the different patches of strips $236_1$-$236_9$ shown in FIG. 2D. More specifically, strips $236_1$-$236_9$ are the strips of light that can be formed in device 200 at plane P2, which represents a beam-steering surface of beam-steering device 234. An individual strip 236 is generally analogous to an individual strip 226. The vertical dashed lines in FIG. 2D indicate the areas (patches) corresponding to WDM channels λ1-λ6 in strips $236_1$-$236_9$. The various patches of light delineated by the dashed lines of FIG. 2D in strips $236_1$-$236_9$ are generally analogous to the above-described patches of light in strips $226_1$-$226_6$ (FIG. 2C).

To direct light from the λ1 area of strip $226_1$ (FIG. 2C) to a selected one of the λ1 areas of strips $236_1$-$236_9$ (FIG. 2D), the routing controller configures the pixelated portion in beam-steering device 224 corresponding to the λ1 area of strip $226_1$ to adopt a beam-steering configuration that produces a corresponding appropriate beam-deflection angle, which is selected, e.g., from a first set consisting of nine discrete angles. For example, a first beam-deflection angle from the first set will cause the light from the λ1 area of strip $226_1$ to be directed to the λ1 area of strip $236_1$. A second beam-deflection angle from the first set will cause the light from the λ1 area of strip $226_1$ to be directed to the λ1 area of strip $236_2$, and so on. A ninth beam-deflection angle from the first set will cause the light from the λ1 area of strip $226_1$ to be directed to the λ1 area of strip $236_9$.

To direct light from the λ1 area of strip $226_2$ (FIG. 2C) to a selected one of the λ1 areas of strips $236_1$-$236_9$ (FIG. 2D), the routing controller configures the pixelated portion in beam-steering device 224 corresponding to the λ1 area of strip $226_2$ to adopt a beam-steering configuration that produces a corresponding appropriate beam-deflection angle, which is selected, e.g., from a second set consisting of nine discrete beam-deflection angles. For example, a first beam-deflection angle from the second set will cause the light from the λ1 area of strip $226_2$ to be directed to the λ1 area of strip $236_1$. A second beam-deflection angle from the second set will cause the light from the λ1 area of strip $226_2$ to be directed to the λ1 area of strip $236_2$, and so on. A ninth beam-deflection angle from the second set will cause the light from the λ1 area of strip $226_2$ to be directed to the λ1 area of strip $236_9$.

One of ordinary skill in the art will understand that the second set of deflection angles differs from the first set of deflection angles by at least one angle value, wherein an angle value includes both the sign (indicative of the deflection direction, e.g., up or down) and the angle magnitude (e.g., expressed in degrees or radians).

To direct light from the λ1 area of strip $226_6$ (FIG. 2C) to a selected one of the λ1 areas of strips $236_1$-$236_9$ (FIG. 2D), the routing controller configures the pixelated portion in beam-steering device 224 corresponding to the λ1 area of strip $226_6$ to adopt a beam-steering configuration that produces a corresponding appropriate beam-deflection angle, which is selected, e.g., from a sixth set consisting of nine discrete beam-deflection angles. For example, a first beam-deflection angle from the sixth set will cause the light from the λ1 area of strip $226_6$ to be directed to the λ1 area of strip $236_1$. A second beam-deflection angle from the sixth set will cause the light from the λ1 area of strip $226_6$ to be directed to the λ1 area of strip $236_2$, and so on. A ninth beam-deflection angle from the sixth set will cause the light from the λ1 area of strip $226_6$ to be directed to the λ1 area of strip $236_9$.

One of ordinary skill in the art will understand that the sixth set of deflection angles is generally analogous to each of the above-mentioned first and second sets of deflection angles. The sixth set of deflection angles is also analogous to each of the third, fourth, and fifth sets of deflection angles corresponding to strips $226_3$-$226_5$, respectively, a description of which was omitted for brevity. It should be apparent to one of ordinary skill in the art that the sixth set of deflection angles may differ from each of the other five sets of deflection angles by at least one angle value.

To avoid signal collisions in the λ1 channel of device 200, the routing controller normally configures beam-steering device 224 so that light from the λ1 areas of two different strips 226 is directed to the λ1 areas of two different respective strips 236. In other words, at any time during the signal-routing operation of device 200, light from the λ1 areas of two or more different strips 226 is not directed to the λ1 area of the same strip 236.

One of ordinary skill in the art will understand that the above-provided description of signal routing in the λ1 channel of device 200 is generally applicable (with minor changes in notation) to other wavelength channels of the device. Nevertheless, as an example, provided below is a description of signal routing in the λ4 channel of device 200. Based on the description of the λ1 and λ4 channels, one of ordinary skill in the art will be able to construct a description of signal routing in any of the remaining four wavelength channels of device 200.

To direct light from the λ4 area of strip $226_1$ (FIG. 2C) to a selected one of the λ4 areas of strips $236_1$-$236_9$ (FIG. 2D), the routing controller configures the pixelated portion in beam-steering device 224 corresponding to the λ4 area of strip $226_1$ to adopt a beam-steering configuration that produces a corresponding appropriate beam-deflection angle, which is selected, e.g., from the first set of (nine discrete) beam-deflection angles. For example, the first beam-deflection angle from the first set will cause the light from the λ4 area of strip $226_1$ to be directed to the λ4 area of strip $236_1$. The second beam-deflection angle from the first set will cause the light from the λ4 area of strip $226_1$ to be directed to the λ4 area of strip $236_2$, and so on. The ninth beam-deflection angle from the first set will cause the light from the λ4 area of strip $226_1$ to be directed to the λ4 area of strip $236_9$.

To direct light from the λ4 area of strip $226_2$ (FIG. 2C) to a selected one of the λ4 areas of strips $236_1$-$236_9$ (FIG. 2D), the routing controller configures the pixelated portion in beam-steering device 224 corresponding to the λ4 area of strip $226_2$ to adopt a beam-steering configuration that produces a corresponding appropriate beam-deflection angle, which is selected, e.g., from the second set of (nine discrete) beam-deflection angles. For example, the first beam-deflection angle from the second set will cause the light from the λ4 area of strip $226_2$ to be directed to the λ4 area of strip $236_1$. The second beam-deflection angle from the second set will cause the light from the λ4 area of strip $226_2$ to be directed to the λ4 area of strip $236_2$, and so on. The ninth beam-deflection angle from the second set will cause the light from the λ4 area of strip $226_2$ to be directed to the λ4 area of strip $236_9$.

To direct light from the λ4 area of strip $226_6$ (FIG. 2C) to a selected one of the λ4 areas of strips $236_1$-$236_9$ (FIG. 2D), the routing controller configures the pixelated portion in beam-steering device 224 corresponding to the λ4 area of strip $226_6$ to adopt a beam-steering configuration that produces a corresponding appropriate beam-deflection angle, which is selected, e.g., from the sixth set of (nine discrete) beam-deflection angles. For example, the first beam-deflection angle from the sixth set will cause the light from the λ4 area of strip $226_6$ to be directed to the λ4 area of strip $236_1$. The second beam-deflection angle from the sixth set will cause the light from the λ4 area of strip $226_6$ to be directed to the λ4 area of strip $236_2$, and so on. The ninth beam-deflection angle from the sixth set will cause the light from the λ4 area of strip $226_6$ to be directed to the λ4 area of strip $236_9$.

To avoid signal collisions in the λ4 channel of device 200, the routing controller normally configures beam-steering device 224 so that light from the λ4 areas of two different strips 226 is directed to the λ4 areas of two different respective strips 236. In other words, at any time during the signal-routing operation of device 200, light from the λ4 areas of two or more different strips 226 is not directed to the λ4 area of the same strip 236.

En route from beam-steering device 224 to beam-steering device 234, the light processed by beam-steering device 224 traverses lens 214c, diffraction grating 218b, lens 214d, diffraction grating 238a, and lens 214e, e.g., as indicated in FIGS. 2A-2B. The part of device 200 between beam-steering device 224 and beam-steering device 234 provides the following function: it transforms angular tilts introduced by beam-steering device 224 into positional shifts on beam-steering device 234, while substantially removing the spectral dispersion introduced by grating 218a and, instead, introducing a possibly different amount of spectral dispersion using grating 238a.

In a representative embodiment, lens 214c is nominally identical to lens 214b. Lens 214c serves to perform at least two functions. First, lens 214c collimates (makes parallel) in the XZ plane the various deflected beams 228 generated by beam-steering device 224 to produce six sets of parallel beams 230, with each set corresponding to one of strips $226_1$-$226_6$ (FIG. 2C). Note that FIG. 2A shows only one set of beams 230, with the other sets of such beams being omitted for clarity of depiction. Second, lens 214c focuses each of beams 230 in the XY plane onto diffraction grating 218b, e.g., as indicated in FIG. 2B.

Diffraction grating 218b substantially removes the spectral dispersion (wavelength-dependent angular diversity) in the XY plane from each of beams 230 to produce beams 240, e.g., as indicated in FIG. 2B. Note that each of beams 240 is a collimated beam. In addition, diffraction grating 218b preserves the above-described beam parallelism, thereby causing different beams 240 within the same beam set to be parallel to one another, e.g., as indicated in FIG. 2A.

Lens 214d focuses beams 240 in the XZ plane onto diffraction grating 238a, e.g., as indicated in FIG. 2A. This light focusing performed by lens 214d creates six virtual point-like sources of light at diffraction grating 238a, with each point-like source corresponding to and receiving light from a respective one of strips $226_1$-$226_6$ (FIG. 2C). The point-like sources are arranged in a linear array, which is oriented along the Z-coordinate axis. Note, however, that FIG. 2A shows only one such source, labeled S1, with the remaining five point-like sources being omitted for clarity of depiction. Due to the light processing performed by all of the upstream optical elements of device 200, each of the point-like sources has very peculiar wavelength-dependent angular-emission characteristics in the XZ plane, e.g., as indicated by beams 244 in FIG. 2A. More specifically, the wavelength-dependent angular-emission characteristics of each point-like source embody the set of beam-deflection angles imparted by beam-steering device 224 onto the different patches (e.g., areas λ1-λ6 in FIG. 2C) of the corresponding strip 226.

Diffraction grating 238a alters the wavelength-dependent angular-emission characteristics of each point-like source by imposing additional spectral dispersion in the XY plane, e.g., as indicated by a diverging sector of traces 246 in FIG. 2B.

Lens 214e, which is positioned to have diffraction grating 238a at its focal plane, collimates the diverging light of traces 246, e.g., as indicated in FIG. 2B. Lens 214e also alters the propagation directions of beams 244 (FIG. 2A) by making the corresponding resulting beams 248 parallel to one another within a beam set corresponding to the same point-like source, such as point-like source S1 shown in FIG. 2A. Beams 248 in FIG. 2A indicate the beam set corresponding to point-like source S1. Other such beam sets are omitted in FIG. 2A for clarity of depiction. Note however that beams 248 corresponding to different point-like sources are generally not parallel to each other. When the various beams 248 corresponding to different point-like sources, such as point-like source S1, impinge onto beam-steering device 234, they collectively generate strips $236_1$-$236_9$ (FIG. 2D) at plane P2 of that beam-steering device.

Each of strips $236_1$-$236_9$ generally receives light from two or more virtual point-like sources, such as point-like source S1. As a result, each set of incoming beams 248 corresponding to any one of strips $236_1$-$236_9$ has some angular diversity in the XZ plane. For example, the λ1 patch of strip $236_1$ may be illuminated by a beam 248 that has a propagation angle in the XZ plane that is different from the propagation angle of a beam 248 that illuminates the λ2 patch of strip $236_1$. A similar statement is generally true for other patches of strip $236_1$ and/or for the various λi patches of each of strips $236_2$-$236_9$ (see FIG. 2D).

The routing controller uses control signal 232 to configure beam-steering device 234 to reduce (e.g., substantially remove) the angular diversity of the various beams 248 corresponding to the same strip 236. For example, beam-steering device 234 may be configured to appropriately deflect the various beams 248 impinging thereupon so that the resulting deflected beams 252 are parallel to the XY plane, e.g., as indicated in FIG. 2A. Thus, beam-steering device 234 substantially generates nine sheets of light, each corresponding to one of strips $236_1$-$236_9$ and oriented parallel to the XY plane.

Lens 214f, diffraction grating 238b, and lens 214g function to couple each of the nine sheets of light generated by beam-steering device 234 into a respective one of output ports $250_1$-$250_9$, e.g., as indicated in FIGS. 2A-2B. Lens 214f is nominally identical to lens 214e and serves to focus the sheets of light generated by beam-steering device 234 onto diffraction grating 238b, e.g., as indicated by converging beams 254 in FIG. 2A and by converging sector(s) of traces 256 in FIG. 2B. Diffraction grating 238b serves to remove the spectral dispersion in the XY plane, thereby converting each of converging sector of traces 256 into a corresponding one of beams 258, e.g., as indicated in FIGS. 2A and 2B. Lens 214g collimates beams 258 in the XZ planes and makes each of the resulting collimated beams 260 substantially parallel to the X-coordinate axis. The latter characteristic enables each of beams 260 to couple, with relatively low loss, into the corresponding one of output ports $250_1$-$250_9$, e.g., as indicated in FIG. 2A.

In a representative embodiment, the types and focal lengths of lenses 214a-214g are selected so as to enable device 200 to properly image the apertures of input ports $210_1$-$210_6$ onto the apertures of output ports $250_1$-$250_9$. The relative positions of the various lenses, diffraction gratings, and beam-steering devices in device 200 may be set based on the relevant principles of relay imaging and/or Fourier optics. For example, lenses 214a and 214b may be configured to image the apertures of input ports $210_1$-$210_6$ onto plane P1. Lenses 214c and 214d may be configured to image plane P1 onto the diffracting surface of diffraction grating 238a. Lenses 214d and 214e may be configured to image plane P2 onto the diffracting surface of diffraction grating 218b. Lenses 214f and 214g may be configured to image the apertures of output ports $250_1$-$250_9$ onto plane P2. Each of diffraction gratings 218 and 238 may be positioned to be at the Fourier plane of the corresponding lens 214. Additional relay optics (not explicitly shown in FIGS. 2A-2B) may be used, e.g., to optically match different sections of device 200 to one another.

Figure 3A:
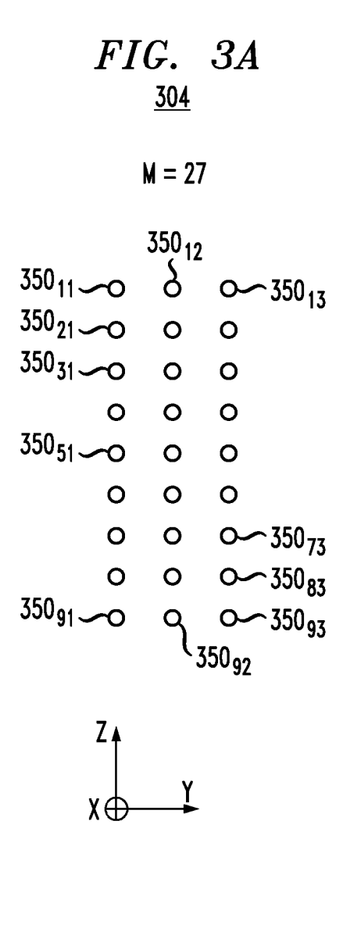
FIGS. 3A-3B illustrate a WSXC device according to another embodiment of the disclosure.
Figure 3B:
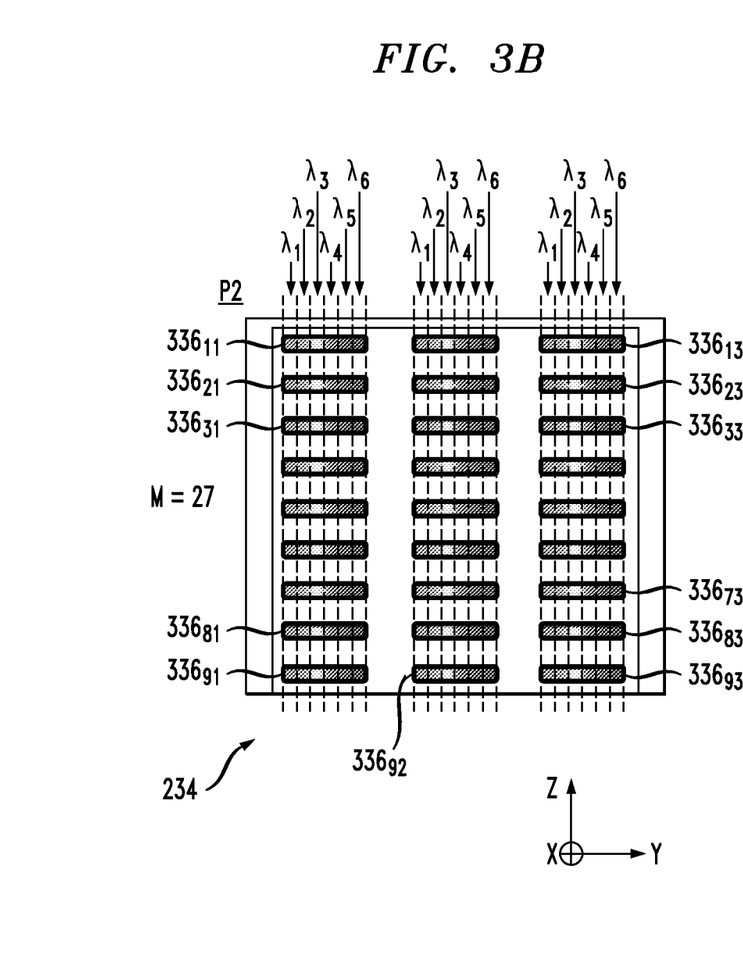

FIGS. 3A-3B illustrate the structure and operation of a WSXC device 300 according to another embodiment of the disclosure. More specifically, FIG. 3A shows a front view of a two-dimensional array 304 of output ports used in device 300. FIG. 3B shows representative strips of spectrally dispersed light that can be produced in device 300 at plane P2 (also see FIGS. 2A-2B).

Although device 300 has a structure that is very similar to the structure of device 200, as shown in FIGS. 2A and 2B, there are certain differences, some of which are described below. Similar to the operation of device 200, the operation of device 300 is explained in reference to six carrier wavelengths λ1-λ6 (i.e., K=6). One of ordinary skill in the art will appreciate that, in alternative embodiments, device 300 may be designed to have any suitable number (N) of input ports, any suitable number (M) of output ports, and any suitable number (K) of WDM channels.

One difference between devices 200 and 300 is that device 300 has twenty-seven output ports $350_{j,k}$ (i.e., M=27) that form two-dimensional (rectangular) array 304 shown in FIG. 3A, where j=1, 2, ..., 9 and k=1, 2, 3. Recall that device 200 has a linear array of nine output ports $250_1$-$250_9$. In device 300, array 304 is used instead of that linear array of output ports 250 (also see FIGS. 2A-2B).

Another difference is that, in device 300, each of beam-steering devices 224 and 234 is configured to provide beam steering not only in the XZ plane, as described above in reference to device 200, but also in the XY plane. This type of beam steering implemented in device 300 may be referred to as two-dimensional steering, which should be contrasted with one-dimensional steering implemented in device 200. One of ordinary skill in the art will appreciate that, with two-dimensional steering, any beam deflection can be decomposed into and characterized by a pair of deflection angles (e.g., analogous to a pair of angles used in a polar coordinate system to characterize the coordinates of a point on a sphere). In a MEMS implementation of beam-steering devices, two-dimensional beam steering may be accomplished with mirrors configured to tilt about two different axes.

Yet another difference is that, in device 300, each of diffraction gratings 238a and 238b has light-dispersion characteristics that enable the beam-steering surface of beam-steering device 234 to accommodate, without overlapping, at least three strips 336 of dispersed light in a single row, e.g., as shown in FIG. 3B. Note that each of strips $336_{j,k}$ (where j=1, 2, ..., 9 and k=1, 2, 3) includes light patches corresponding to all six WDM channels of the device, as indicated by the vertical dashed lines and carrier-wavelength labels λ1-λ6.

To implement the requisite wavelength-selective mapping of the linear array of six input ports $210_1$-$210_6$ onto rectangular array 304 of twenty-seven output ports $350_{j,k}$, each pixelated portion of beam-steering device 224 can be configured, based on control signal 222, to produce twenty-seven different (two-dimensional) beam-deflection angles. As already indicated above, each such deflection angle can be characterized by a pair of angle values, wherein the first angle value quantifies beam deflection with respect to a first tilt axis, and the second angle value quantifies beam deflection with respect to a second tilt axis, e.g., orthogonal to the first tilt axis. For some pairs, either the first angle value or the second angle value may be zero. This configuration of beam-steering device 224 enables device 300 to appropriately distribute light from the different patches of strips $226_1$-$226_6$ shown in FIG. 2C into the different patches of strips $336_{1,1}$-$336_{9,3}$ shown in FIG. 3B.

For example, to direct light from the λ1 area of strip $226_1$ (FIG. 2C) to a selected one of the λ1 areas of strips $336_{1,1}$-$336_{9,3}$ (FIG. 3B), the routing controller configures the pixelated portion in beam-steering device 224 corresponding to the λ1 area of strip $226_1$ to adopt a beam-steering configuration that produces a corresponding appropriate (two-dimensional) beam-deflection angle, which is selected, e.g., from a first set consisting of twenty-seven such angles, wherein each angle is represented by a corresponding pair of angle values, as explained above. More specifically, a first beam-deflection angle from the first set will cause the light from the λ1 area of strip $226_1$ to be directed to the λ1 area of strip $336_{1,1}$. A second beam-deflection angle from the first set will cause the light from the λ1 area of strip $226_1$ to be directed to the λ1 area of strip $336_{2,2}$, and so on. A twenty-seventh beam-deflection angle from the first set will cause the light from the λ1 area of strip $226_1$ to be directed to the λ1 area of strip $336_{9,3}$.

To direct light from the λ1 area of strip $226_2$ (FIG. 2C) to a selected one of the λ1 areas of strips $336_{1,1}$-$336_{9,3}$ (FIG. 3B), the routing controller configures the pixelated portion in beam-steering device 224 corresponding to the λ1 area of strip $226_2$ to adopt a beam-steering configuration that produces a corresponding appropriate beam-deflection angle, which is selected, e.g., from a second set consisting of twenty-seven beam-deflection angles, wherein each angle is represented by a corresponding pair of angle values, as explained above. More specifically, a first beam-deflection angle from the second set will cause the light from the λ1 area of strip $226_2$ to be directed to the λ1 area of strip $336_{1,1}$. A second beam-deflection angle from the second set will cause the light from the λ1 area of strip $226_2$ to be directed to the λ1 area of strip $336_{2,1}$, and so on. A twenty-seventh beam-deflection angle from the second set will cause the light from the λ1 area of strip $226_2$ to be directed to the λ1 area of strip $336_{9,3}$.

One of ordinary skill in the art will understand that the second set of deflection angles differs from the first set of deflection angles by at least one angle value.

To direct light from the λ1 area of strip $226_6$ (FIG. 2C) to a selected one of the λ1 areas of strips $336_{1,1}$-$336_{9,3}$ (FIG. 3B), the routing controller configures the pixelated portion in beam-steering device 224 corresponding to the λ1 area of strip $226_6$ to adopt a beam-steering configuration that produces a corresponding appropriate (two-dimensional) beam-deflection angle, which is selected, e.g., from a sixth set consisting of twenty-seven beam-deflection angles, wherein each angle is represented by a corresponding pair of angle values, as explained above. More specifically, a first beam-deflection angle from the sixth set will cause the light from the λ1 area of strip $226_6$ to be directed to the λ1 area of strip $336_{1,1}$. A second beam-deflection angle from the sixth set will cause the light from the λ1 area of strip $226_6$ to be directed to the λ1 area of strip $336_{2,1}$, and so on. A twenty-seventh beam-deflection angle from the sixth set will cause the light from the λ1 area of strip $226_6$ to be directed to the λ1 area of strip $336_{9,3}$.

One of ordinary skill in the art will understand that the sixth set of deflection angles is generally analogous to each of the above-mentioned first and second sets of deflection angles. The sixth set of deflection angles is also analogous to each of the third, fourth, and fifth sets of deflection angles, a description of which was omitted for brevity. It should be apparent to one of ordinary skill in the art that the sixth set of deflection angles may differ from each of the other five sets of deflection angles by at least one angle value.

To avoid signal collisions in the λ1 channel of device 300, the routing controller normally configures beam-steering device 224 so that light from the λ1 areas of two different strips 226 is directed to the λ1 areas of two different respective strips 336. In other words, at any time during the signal-routing operation of device 300, light from the λ1 areas of two or more different strips 226 is not directed to the λ1 area of the same strip 336.

One of ordinary skill in the art will understand that the above-provided description of signal routing in the λ1 channel of device 300 is generally applicable (with minor changes in notation) to other wavelength channels of the device. An example of modifying the description of signal routing in the λ1 channel of device 200 to obtain a description of signal routing in the λ4 channel of device 200 is already provided above. One of ordinary skill in the art will be able to apply similar description-modification principles to the above-provided description of signal routing in the λ1 channel of device 300 to derive a description of signal routing for each of the other five wavelength channels of that device.

One additional difference in the operation of devices 200 and 300 is that lenses 214f and 214g and diffraction grating 238b in device 300 function to image the two-dimensional array of strips $336_{1,1}$-$336_{9,3}$ (FIG. 3B) onto the apertures of two-dimensional array 304 of output ports $350_{1,1}$-$350_{9,3}$ (FIG. 3A) so that each strip $336_{j,k}$ is imaged onto the corresponding output port $350_{j,k}$. Recall that, in device 200, lenses 214f and 214g and diffraction grating 238b function to image the linear array of strips $236_1$-$236_9$ (FIG. 2D) onto the apertures of the linear array of output ports $250_1$-$250_9$ (FIGS. 2A-2B).

Figure 4A:
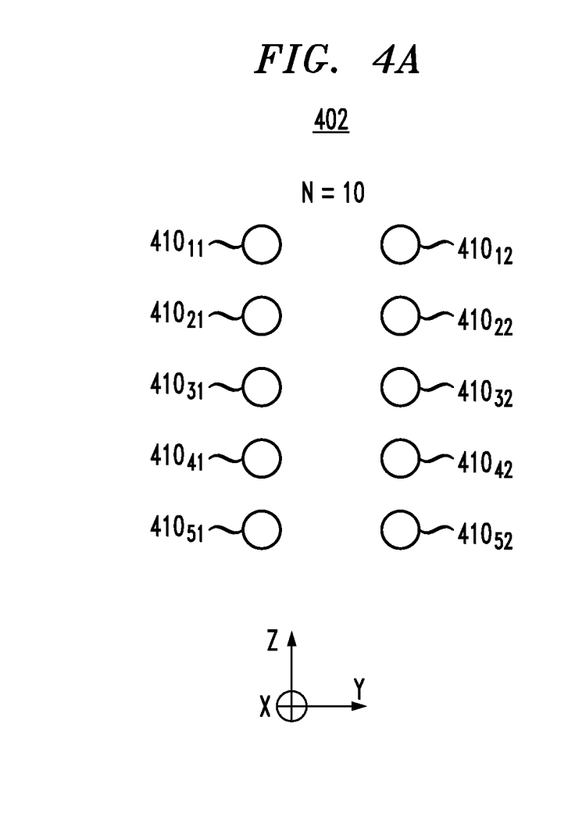
FIGS. 4A-4B illustrate a WSXC device according to yet another embodiment of the disclosure.
Figure 4B:
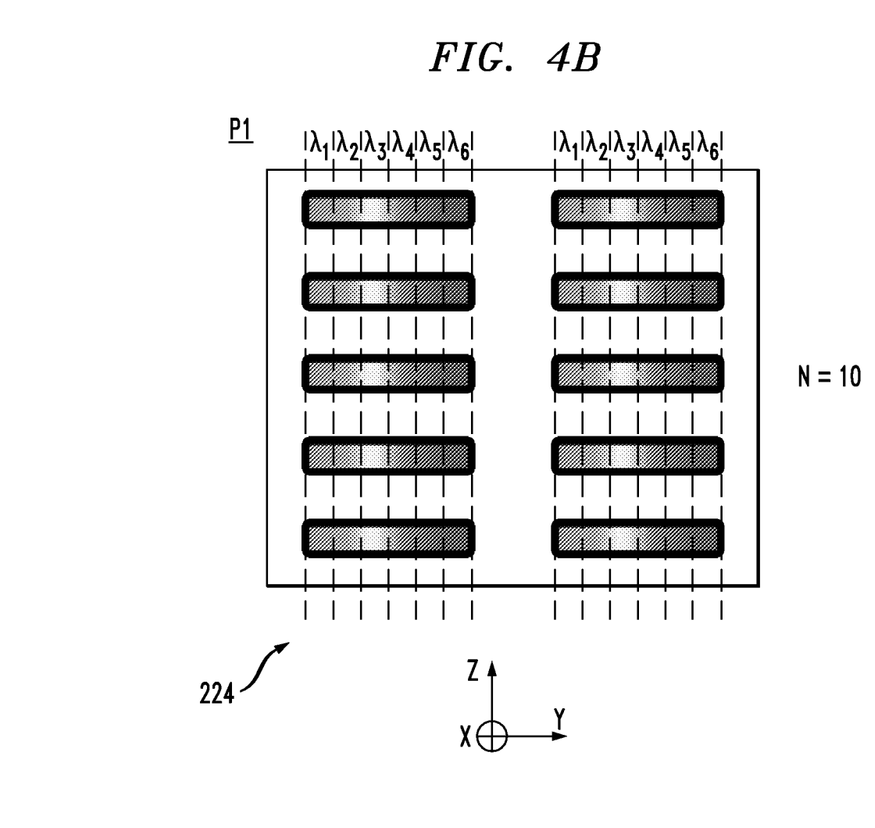

FIGS. 4A-4B illustrate the structure and operation of a WSXC device 400 according to yet another embodiment of the disclosure. More specifically, FIG. 4A shows a front view of a two-dimensional array 402 of input ports used in device 400. FIG. 4B shows representative strips of spectrally dispersed light that can be produced in device 400 at plane P1 (also see FIGS. 2A-2B).

Device 400 is a further modification of device 300, in which the linear array of input ports $210_1$-$210_6$ (see FIGS. 2A-2B) is replaced by ten input ports $410_{l,m}$ (i.e., N=10) that form two-dimensional array 402 shown in FIG. 4A, where l=1, 2, . . . , 5 and m=1, 2. One additional modification is that, in device 400, each of diffraction gratings 218a and 218b has light dispersion characteristics that enable the beam-steering surface of beam-steering device 224 to accommodate, without overlapping, at least two strips 426 of dispersed light in a single row, e.g., as shown in FIG. 4B. Note that each of strips $426_{l,m}$ (where l=1, 2, . . . , 5 and m=1, 2) includes light patches corresponding to all six WDM channels of device 400, as indicated by the vertical dashed lines and carrier-wavelength labels λ1-λ6.

Similar to beam-steering devices 224 and 234 in device 300, beam-steering devices 224 and 234 in device 400 are configured to perform two-dimensional beam-steering, with the capability to change a beam's propagation direction in both the XZ plane and the XY plane. The implemented beam steering enables device 400 to direct light, on a per-patch basis, from any of strips $426_{l,m}$ (FIG. 4B) to any of strips $336_{j,k}$ (FIG. 3B). A detailed description of the beam steering implemented in device 400 is not given here because one of ordinary skill in the art will readily understand it based on the above-provided description of the beam steering implemented in devices 200 and 300.

It should be noted that the structure of device 200 shown in FIGS. 2A-2B can generally be modified to produce a WSXC device that has any desired number N of input ports and any desired number M of output ports. Both the input ports and the output ports in the resulting WSXC device can be arranged to form a respective one- or two-dimensional array of any desirable shape and orientation. The design and engineering of such a WSXC device can be accomplished in a relatively straightforward manner by observing the following exemplary guidelines.

A front section of the WSXC device, e.g., comprising lens 214a, diffraction grating 218a, and lens 214b, is configured to image the apertures of the input ports, such as input ports 210 of FIGS. 2A-2B or input ports 410 of FIG. 4A, onto a beam-steering surface (e.g., P1 in FIGS. 2A-2B) of beam-steering device 224. The presence of diffraction grating 218a at the focal plane of lenses 214a and 214b causes the images of the individual input ports formed at plane P1 to be spectrally dispersed in the direction parallel to the Y-coordinate axis. The spectral-dispersing characteristics of diffraction grating 218a are selected so that the spectrally dispersed images of different input ports do not overlap with one another in plane P1.

A back section of the WSXC device, e.g., comprising lens 214g, diffraction grating 238b, and lens 214f, is configured similar to the front section to image the apertures of the output ports, such as output ports 250 of FIGS. 2A-2B or output ports 350 of FIG. 3A, onto a beam-steering surface (e.g., P2 in FIGS. 2A-2B) of beam-steering device 234. However, one configurational difference between the front and back sections is that, in operation, light flows through them in opposite directions. More specifically, in the front section, the light flows from the ports toward the image plane (P1 in FIGS. 2A-2B). In contrast, in the back section, the light flows from the image plane (P2 in FIGS. 2A-2B) to the ports.

A middle section of the WSXC device, e.g., comprising lens 214c, diffraction grating 218b, lens 214d, diffraction grating 238a, and lens 214e, is configured to image the spectrally dispersed images of the input ports formed at plane P1 onto the virtual spectrally dispersed images of the output ports at plane P2. As already indicated above, the beam steering implemented by beam-steering device 224 serves to (re)configurably direct light, on a per-patch basis, from each of the spectrally dispersed images of the input ports formed at plane P1 to a respective designated one of the virtual spectrally dispersed images of the output ports at plane P2. The beam steering implemented by beam-steering device 234 serves to substantially remove the angular beam diversity at each of the virtual spectrally dispersed output-port images at plane P2 caused by the beam steering performed by beam-steering device 224, thereby enabling the back section of the WSXC device to appropriately couple the light arriving at each of the virtual output-port images in plane P2 into the respective one of the output ports.

A routing controller can use control signal 222 to appropriately control the beam-steering configuration of beam-steering device 224 to avoid signal collisions at plane P2. The routing controller can further use control signal 232 to appropriately control the beam-steering configuration of beam-steering device 234 to enable a substantial removal of the above-mentioned angular beam diversity. The routing controller also operates to ensure that the beam-steering configurations of beam-steering devices 224 and 234 are changed in concert to preserve proper operation of the WSXC device when there is a need to change the device's routing configuration.

Figure 5:
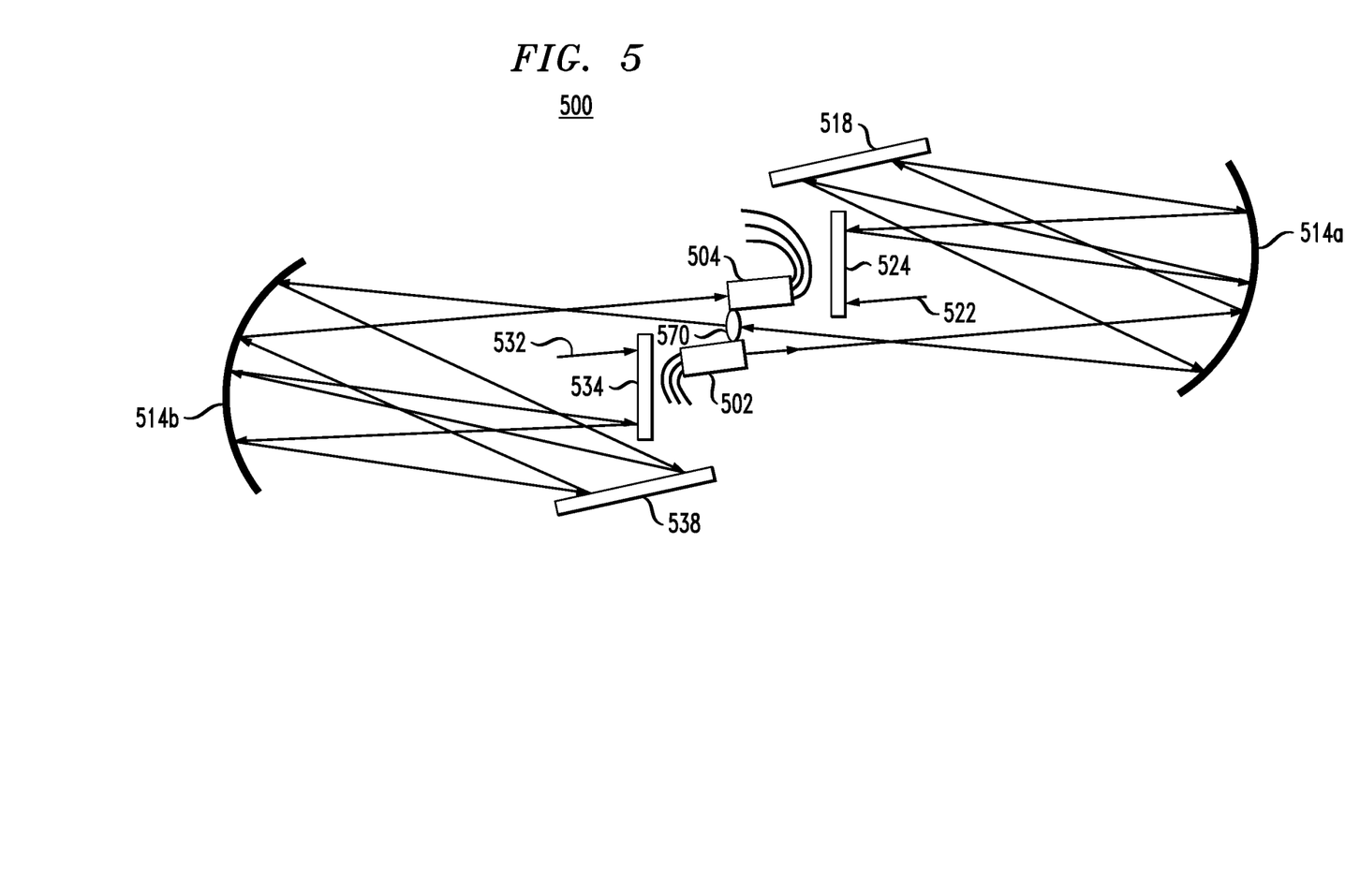
FIG. 5 shows a block diagram of a WSXC device according to yet another embodiment of the disclosure.

FIG. 5 shows a block diagram of a WSXC device 500 according to yet another embodiment of the disclosure. Device 500 is generally analogous to device 200 (FIGS. 2A-2B), with the functionally analogous elements of the two devices being labeled with numerical labels having the same last two digits. However, one difference between devices 200 and 500 is that the latter represents a folded configuration. As used herein, the term "folded configuration" refers to an optical layout in which some optical elements may be traversed by light two or more times along the optical path that the light takes between an input port of the device and an output port of the device. As used herein, the term "traverse" should be construed to encompass at least two different types of events, one type being an event during which light passes or gets transmitted through an optical component, and another type being an event during which light is reflected or deflected by an optical component. The various light traces shown in FIG. 5 illustrate a representative optical path that the light takes in device 500 between one of the input ports in an input-port array 502 and one of the output ports in an output-port array 504. Inspection of these traces reveals that device 500 has a folded configuration, e.g., because each of diffraction gratings 518 and 538 is traversed two times. The use of a folded configuration may be advantageous, e.g., because the corresponding physical device can be implemented using fewer optical components and, as a result, be more compact and/or less expensive than that employing a corresponding unfolded configuration.

In operation, an input port of array 502 directs a respective WDM signal to a curved mirror 514a. Mirror 514a redirects the WDM signal to diffraction grating 518. Diffraction grating 518 spectrally disperses the received WDM signal and directs the dispersed signal back to mirror 514a, which further directs the dispersed signal to a beam-steering device 524. Beam-steering device 524, being controlled by a control signal 522 generated by a routing controller (not explicitly shown in FIG. 5), appropriately deflects the various optical beams having different carrier wavelengths and directs the variously deflected beams back to mirror 514a, which then redirects these beams to diffraction grating 518. Diffraction grating 518 partially collimates the beams by removing the spectral dispersion and directs the resulting collimated signal back to mirror 514a, which further directs the collimated signal, via a lens 570, to a mirror 514b.

On the first pass, diffraction grating 518 performs an optical function that is similar to that performed by diffraction grating 218a in device 200. On the second pass, diffraction grating 518 performs an optical function that is similar to that performed by diffraction grating 218b in device 200. On the first, second and third passes, mirror 514a performs optical functions that are similar to those performed by lens 214a, lens 214b, and lens 214c, respectively, in device 200. Collectively, the fourth pass of mirror 514a, lens 570, and the first pass of mirror 514b implement an optical function that is similar to that performed by lens 214d in device 200.

Mirror 514b redirects the signal received from mirror 514a to diffraction grating 538. Diffraction grating 538 spectrally disperses the received signal and directs the dispersed signal back to mirror 514b, which further directs the dispersed signal to a beam-steering device 534. Beam-steering device 534, being controlled by a control signal 532 generated by the routing controller, appropriately deflects the various optical beams having different carrier wavelengths and directs the variously deflected beams back to mirror 514b, which then redirects these beams to diffraction grating 538. Diffraction grating 538 partially collimates the beams by removing the spectral dispersion and directs the resulting collimated signal back to mirror 514b, which further directs the collimated signal to output-port array 504.

On the first pass, diffraction grating 538 performs an optical function that is similar to that performed by diffraction grating 238a in device 200. On the second pass, diffraction grating 538 performs an optical function that is similar to that performed by diffraction grating 238b in device 200. On the second, third, and fourth passes, mirror 514b performs optical functions that are similar to those performed by lens 214e, lens 214f, and lens 214g, respectively, in device 200.

Figure 6:
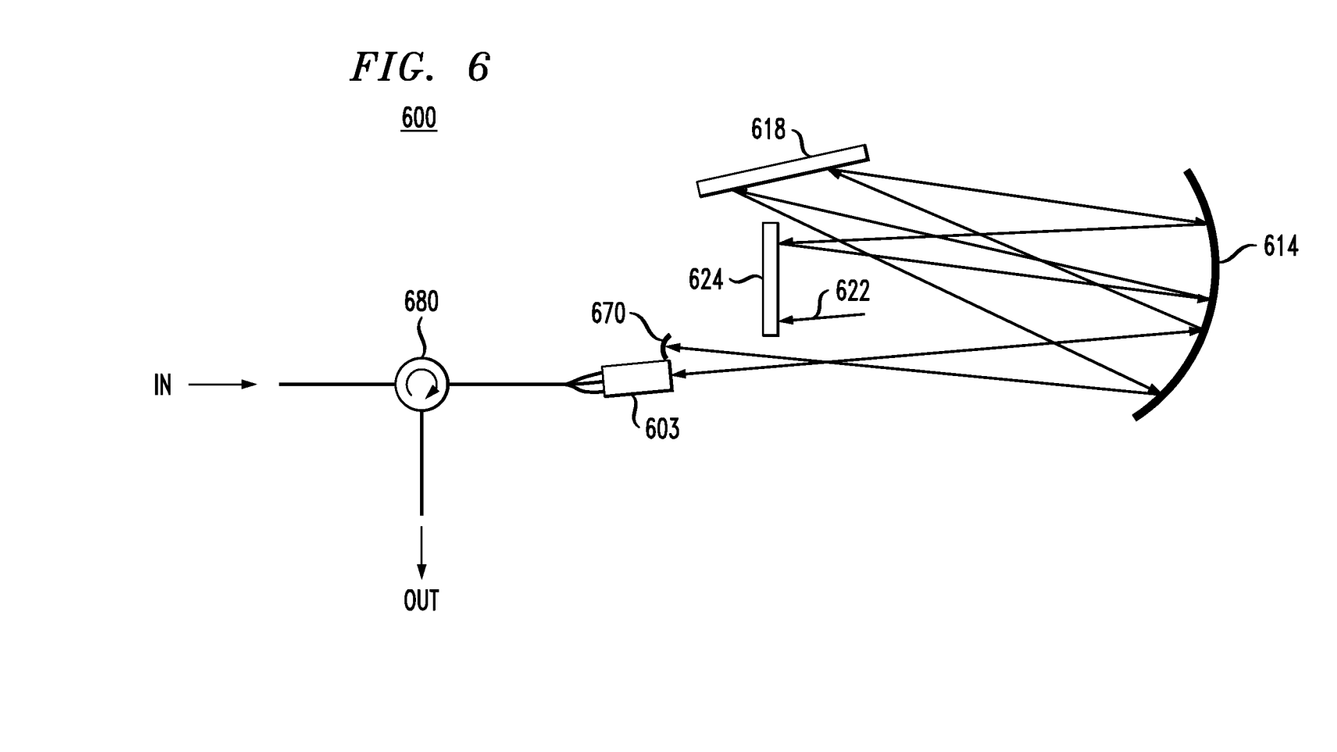
FIG. 6 shows a block diagram of a WSXC device according to yet another embodiment of the disclosure.

FIG. 6 shows a block diagram of a WSXC device 600 according to yet another embodiment of the disclosure. Device 600 represents further folding of device 500 (FIG. 5). More specifically, the folding is accomplished by (i) employing a curved mirror 670 instead of lens 570, (ii) removing a section of the device, and (iii) employing a single array 603 of ports as both input ports and output ports, with the separation of the incoming and outgoing optical signals being performed using an optical circulator 680.

In operation, a port of array 603 operating as an input port directs a WDM signal to be processed to a curved mirror 614. Mirror 614 redirects the WDM signal to a diffraction grating 618. Diffraction grating 618 spectrally disperses the received WDM signal and directs the dispersed signal back to mirror 614, which further directs the dispersed signal to a beam-steering device 624. Beam-steering device 624, being controlled by a control signal 622 generated by a routing controller (not explicitly shown in FIG. 6), appropriately deflects the various optical beams having different carrier wavelengths and directs the variously deflected beams back to mirror 614, which then redirects these beams to diffraction grating 618. Diffraction grating 618 partially collimates the beams by removing the spectral dispersion and directs the resulting collimated signal back to mirror 614, which further directs the collimated signal to mirror 670.

Mirror 670 returns the collimated signal back to mirror 614, which then redirects it to diffraction grating 618. Diffraction grating 618 spectrally disperses the received signal and directs the dispersed signal back to mirror 614, which further directs the dispersed signal to beam-steering device 624. Beam-steering device 624 appropriately deflects the various optical beams having different carrier wavelengths and directs the variously deflected beams back to mirror 614, which then redirects these beams to diffraction grating 618. Diffraction grating 618 partially collimates the beams by removing the spectral dispersion and directs the resulting collimated signal back to mirror 614, which further directs the collimated signal to port array 603.

On the first, second, third, and fourth passes, diffraction grating 618 performs optical functions that are similar to those performed by diffraction gratings 218a, 218b, 238a, and 238b, respectively, in device 200. On the first, second, third, sixth, seventh, and eighth passes, mirror 614 performs optical functions that are similar to those performed by lenses 214a, 214b, 214c, 214e, 214f, and 214g, respectively, in device 200. Collectively, mirror 670 and the fourth and fifth passes of mirror 614 implement an optical function that is similar to that performed by lens 214d in device 200.

Having a common collimated signal directed to port array 603 for both input and output purposes enables flexible rearrangement and reassignment of the various ports to change the effective operative values of M and/or N.

In one embodiment, the functions performed by optical circulator 680 and by the collimation and any polarization diversity optics may be implemented using a combined set of optical elements.

In one embodiment, various port arrays can be implemented using a planar waveguide circuit, which enables implementation of additional functionality, such as optical taps for power monitoring.

While this invention has been described with reference to illustrative embodiments, this description is not intended to be construed in a limiting sense.

Although various embodiments described in the disclosure have M>N, the invention(s) are not so limited. From the provided description, one of ordinary skill in the art will understand how to make and use WSXC devices for which M<N or M=N. These devices may also be configured to implement the effective value of M=1, with the second steering stage operating to ensure that no light is transmitted to an output port during reconfiguration of the switch. In addition, the second stage of beam steering tends to improve the isolation between the ports, thereby reducing crosstalk.

In an alternative embodiment of device 500 (FIG. 5), lens 570 may be replaced by a curved mirror, subject to appropriate repositioning of elements 514b, 534, 538, and 504.

The use of a pixilated array, such as the liquid crystal on silicon display technology, allows for arbitrary wavelength-channel spacing and arbitrary channel pass-bands widths in some embodiments. This feature can be achieved, e.g., by introducing appropriate beam steering. It additionally permits power splitting for broadcast, protection, or monitoring functions. It also enables intra- and inter-channel equalization and dispersion compensation through modification of the pixel patterns.

In some embodiments, polarization-diversity optics can be used to allow for polarization-dependent optical elements in the system.

Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, microsystems, and devices produced using microsystems technology or microsystems integration.

In some embodiments, beam steering may be implemented using a phased array element, such as liquid crystal on silicon micro displays or through an array of micromechanical phase shifters, or through arrays of electro-optic phase shifters using semiconductors, e.g., GaAs.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry and/or devices embodying the principles of the invention.

What is claimed is:

1. An apparatus, comprising:
 a first plurality of ports;
 a second plurality of ports;
 a first diffraction grating interposed between the first plurality of ports and the second plurality of ports; and
 a first beam-steering device interposed between the first plurality of ports and the second plurality of ports, wherein:

each port of the first plurality is configured to receive a respective input WDM signal having two or more respective WDM components;

the apparatus is configured to variously route the WDM components from the first plurality of ports to the second plurality of ports so that each of the WDM components traverses the first diffraction grating and the first beam-steering device;

the first diffraction grating is configured to spectrally disperse light received from the first plurality of ports and direct spectrally dispersed light to the first beam-steering device;

the first beam-steering device is configurable to individually steer beams corresponding to different wavelength bands of the spectrally dispersed light received from the first diffraction grating to enable the apparatus to route any of the WDM components from the respective port of the first plurality to any port of the second plurality; and the apparatus has a folded structure that causes a WDM component to traverse the first diffraction grating four times.

2. The apparatus of claim 1, wherein the first plurality of ports and the second plurality of ports have at least one port in common.

3. The apparatus of claim 2, further comprising an optical circulator connected to a first of said common ports and configured to separate an output WDM signal applied to the first common port from the input WDM signal received by the first common port.

4. The apparatus of claim 1, wherein the folded structure causes the WDM component to traverse the first beam-steering device two times.

5. The apparatus of claim 4, further comprising a curved mirror configured to direct light between the first diffraction grating and the first beam-steering device so that the WDM component traverses the mirror eight times.

6. The apparatus of claim 1, wherein the ports of the first plurality are arranged in a two-dimensional array.

7. The apparatus of claim 6, wherein the ports of the second plurality are arranged in a two-dimensional array.

8. The apparatus of claim 1, wherein the ports of the second plurality are arranged in a two-dimensional array.

9. The apparatus of claim 1, wherein the first beam-steering device comprises a two-dimensional pixelated MEMS mirror array.

10. The apparatus of claim 9, wherein at least one mirror in said array is configured to tilt around two different axes.

11. The apparatus of claim 1, wherein the first beam-steering device comprises a pixelated liquid-crystal-on-silicon micro-display.

12. An apparatus, comprising:
a first plurality of ports;
a second plurality of ports;
a first diffraction grating interposed between the first plurality of ports and the second plurality of ports; and
a first beam-steering device interposed between the first plurality of ports and the second plurality of ports, wherein:
each port of the first plurality is configured to receive a respective input WDM signal having two or more respective WDM components;
the apparatus is configured to variously route the WDM components from the first plurality of ports to the second plurality of ports so that each of the WDM components traverses the first diffraction grating and the first beam-steering device;

the first diffraction grating is configured to spectrally disperse light received from the first plurality of ports and direct spectrally dispersed light to the first beam-steering device; and the first beam-steering device is configurable to individually steer beams corresponding to different wavelength bands of the spectrally dispersed light received from the first diffraction grating to enable the apparatus to route any of the WDM components from the respective port of the first plurality to any port of the second plurality;

a second diffraction grating interposed between the first plurality of ports and the second plurality of ports; and a second beam-steering device interposed between the first plurality of ports and the second plurality of ports, wherein the apparatus is further configured to route the WDM components from the first plurality of ports to the second plurality of ports so that each of the WDM components also traverses the second diffraction grating and the second beam-steering device; and wherein the apparatus has a folded structure that causes a WDM component to traverse each of the first diffraction grating and the second diffraction grating two times.

13. The apparatus of claim 12, wherein, for each port of the second plurality:
the second beam-steering device is configured to reduce angular diversity among optical beams that carry the WDM components routed to the port; and
the second diffraction grating is configured to remove spectral dispersion of said optical beams.

14. The apparatus of claim 12, further comprising:
a first curved mirror configured to direct light between the first diffraction grating and the first beam-steering device so that the WDM component traverses the first mirror four times; and
a second curved mirror configured to direct light between the second diffraction grating and the second beam-steering device so that the WDM component traverses the second mirror four times.

15. An apparatus, comprising:
a first plurality of ports;
a second plurality of ports;
a first diffraction grating interposed between the first plurality of ports and the second plurality of ports; and
a first beam-steering device interposed between the first plurality of ports and the second plurality of ports, wherein:
each port of the first plurality is configured to receive a respective input WDM signal having two or more respective WDM components;
the apparatus is configured to variously route the WDM components from the first plurality of ports to the second plurality of ports so that each of the WDM components traverses the first diffraction grating and the first beam-steering device;

the first diffraction grating is configured to spectrally disperse light received from the first plurality of ports and direct spectrally dispersed light to the first beam-steering device; and the first beam-steering device is configurable to individually steer beams corresponding to different wavelength bands of the spectrally dispersed light received from the first diffraction grating to enable the apparatus to route any of the WDM components from the respective port of the first plurality to any port of the second plurality;

a second diffraction grating interposed between the first plurality of ports and the second plurality of ports; and
a second beam-steering device interposed between the first plurality of ports and the second plurality of ports, wherein the apparatus is further configured to route the WDM components from the first plurality of ports to the second plurality of ports so that each of the WDM components also traverses the second diffraction grating and the second beam-steering device; and
wherein the second diffraction grating has nominal spectral-dispersion characteristics that are different from nominal spectral-dispersion characteristics of the first diffraction grating.

16. An apparatus, comprising:
a first plurality of ports;
a second plurality of ports;
a first diffraction grating interposed between the first plurality of ports and the second plurality of ports; and
a first beam-steering device interposed between the first plurality of ports and the second plurality of ports, wherein:
  each port of the first plurality is configured to receive a respective input WDM signal having two or more respective WDM components;
  the apparatus is configured to variously route the WDM components from the first plurality of ports to the second plurality of ports so that each of the WDM components traverses the first diffraction grating and the first beam-steering device;
  the first diffraction grating is configured to spectrally disperse light received from the first plurality of ports and direct spectrally dispersed light to the first beam-steering device; and
  the first beam-steering device is configurable to individually steer beams corresponding to different wavelength bands of the spectrally dispersed light received from the first diffraction grating to enable the apparatus to route any of the WDM components from the respective port of the first plurality to any port of the second plurality;
a second diffraction grating interposed between the first plurality of ports and the second plurality of ports;
a second beam-steering device interposed between the first plurality of ports and the second plurality of ports, wherein the apparatus is further configured to route the WDM components from the first plurality of ports to the second plurality of ports so that each of the WDM components also traverses the second diffraction grating and the second beam-steering device;
a third diffraction grating interposed between the first plurality of ports and the second plurality of ports; and
a fourth diffraction grating interposed between the first plurality of ports and the second plurality of ports, wherein the apparatus is further configured to route the WDM components from the first plurality of ports to the second plurality of ports so that each of the WDM components also traverses the third diffraction grating and the fourth diffraction grating.

17. The apparatus of claim 16, wherein:
the first and third diffraction gratings have identical nominal spectral-dispersion characteristics; and
the second and fourth diffraction gratings have identical nominal spectral-dispersion characteristics.

18. The apparatus of claim 17, wherein the nominal spectral-dispersion characteristics of the first and third diffraction gratings are different from the nominal spectral-dispersion characteristics of the second and fourth diffraction gratings.

* * * * *